(12) United States Patent
Jafari et al.

(10) Patent No.: US 10,678,337 B2
(45) Date of Patent: Jun. 9, 2020

(54) CONTEXT AWARE MOVEMENT RECOGNITION SYSTEM

(71) Applicant: THE TEXAS A&M UNIVERSITY SYSTEM, College Station, TX (US)

(72) Inventors: Roozbeh Jafari, Austin, TX (US); Jian Wu, College Station, TX (US)

(73) Assignee: The Texas A&M University System, College Station, TX (US)

( * ) Notice: Subject to any disclaimer, the term of this patent is extended or adjusted under 35 U.S.C. 154(b) by 125 days.

(21) Appl. No.: 15/398,392

(22) Filed: Jan. 4, 2017

(65) Prior Publication Data
US 2017/0192521 A1 Jul. 6, 2017

Related U.S. Application Data

(60) Provisional application No. 62/274,663, filed on Jan. 4, 2016.

(51) Int. Cl.
  G06F 3/01 (2006.01)
  G06F 3/0346 (2013.01)
  G06F 3/038 (2013.01)

(52) U.S. Cl.
  CPC .............. *G06F 3/017* (2013.01); *G06F 3/011* (2013.01); *G06F 3/038* (2013.01); *G06F 3/0346* (2013.01); *G06F 2203/0381* (2013.01)

(58) Field of Classification Search
  CPC ........ G06F 3/017; G06F 3/038; G06F 3/0346; G06F 3/011; G06F 2203/0381
  See application file for complete search history.

(56) References Cited

U.S. PATENT DOCUMENTS

| | | | | |
|---|---|---|---|---|
| 9,558,399 B1* | 1/2017 | Jeka | ................... | G06K 9/00523 |
| 10,093,280 B2* | 10/2018 | Youssef | ................ | G06F 3/0346 |
| 10,142,789 B2* | 11/2018 | Chowdhary | .......... | H04W 4/027 |
| 10,173,060 B2* | 1/2019 | Wong | ................... | A61B 5/1101 |
| 10,206,627 B2* | 2/2019 | LeBoeuf | ................ | G16H 20/17 |
| 2005/0253806 A1* | 11/2005 | Liberty | ................. | G06F 1/3215 345/156 |
| 2007/0032748 A1* | 2/2007 | McNeil | ................ | A61B 5/1038 600/595 |
| 2008/0174550 A1* | 7/2008 | Laurila | ................... | A63F 13/02 345/158 |
| 2009/0033807 A1* | 2/2009 | Sheng | .................. | H04N 5/4403 348/734 |

(Continued)

*Primary Examiner* — Chad M Dicke
(74) *Attorney, Agent, or Firm* — Conley Rose, P.C.

(57) ABSTRACT

A movement recognition system includes a feature extraction circuit and a classification circuit that is orientation independent. The feature extraction circuit is configured to receive a plurality of acceleration or angular velocity measurements from a sensor or multiple sensors that include a three dimensional (3D) accelerometer and 3D gyroscope. Each of the measurements is taken at different times. The feature extraction circuit is also configured to determine a difference between a first of the measurements and each other of the measurements. The classification circuit is configured to classify a movement of an object attached to the sensor irrespective of an orientation of the sensor on the object utilizing a signal recognition technique based on the difference between the first of the measurements and each other of the measurements.

25 Claims, 6 Drawing Sheets

(56) References Cited

U.S. PATENT DOCUMENTS

| | | | |
|---|---|---|---|
| 2010/0245131 A1* | 9/2010 | Graumann | G01P 15/00 341/20 |
| 2010/0305899 A1* | 12/2010 | Czompo | G01C 25/005 702/152 |
| 2011/0014977 A1* | 1/2011 | Yamazaki | A63F 13/04 463/30 |
| 2012/0272194 A1* | 10/2012 | Yang | G06F 3/017 715/863 |
| 2012/0323521 A1* | 12/2012 | De Foras | G06F 3/017 702/141 |
| 2014/0066816 A1* | 3/2014 | McNames | A61B 5/002 600/595 |
| 2014/0129937 A1* | 5/2014 | Jarvinen | G06F 3/0487 715/716 |
| 2015/0103189 A1* | 4/2015 | Karpenko | H04N 5/23264 348/208.2 |
| 2016/0210505 A1* | 7/2016 | Chiu | G06F 3/0346 |
| 2016/0278647 A1* | 9/2016 | Vogel | A61B 5/02438 |
| 2016/0327397 A1* | 11/2016 | Cordova | G06Q 40/08 |
| 2017/0234706 A1* | 8/2017 | Martin | G01D 11/245 29/407.05 |
| 2019/0143111 A1* | 5/2019 | Wong | A61B 5/1101 |

* cited by examiner

CONTEXT AWARE MOVEMENT RECOGNITION SYSTEM

CROSS-REFERENCE TO RELATED APPLICATIONS

This application claims benefit of U.S. Provisional Application Ser. No. 62/274,663 filed Jan. 4, 2016, and entitled "Context Aware Gesture Recognition System," which is hereby incorporated herein by reference in its entirety.

BACKGROUND

Inertial body sensors have been used for measurement or recognition of human body movements (e.g., gestures, motor functions, activities) spanning various applications including healthcare rehabilitation and consumer electronics entertainment applications. The design of the movement recognition algorithms typically requires information about the placement and orientation of the inertial sensors on the body, and the signal processing is often designed to work with a known orientation and placement of the sensors. However, accidental displacement of the sensors may occur due to the user's movement. This would necessitate recalibration of the sensors and/or signal processing techniques.

SUMMARY

The problems noted above are solved in large part by systems and methods for context aware movement recognition that would operate with any placement of sensors on a specific body joint or segment. In some embodiments, a movement recognition system includes an orientation independent feature extraction circuit and a classification circuit. The feature extraction circuit is configured to receive a plurality of measurements of a first unit of inertia from a sensor or plurality of sensors placed on various body segments that include a three dimensional (3D) accelerometer and a 3D gyroscope. Each of the measurements is taken at different times. The feature extraction circuit is also configured to determine a difference between a first of the measurements and each other of the measurements. The classification circuit is configured to classify a movement of an object attached to the sensor irrespective of an orientation of the sensor on the object utilizing a signal recognition technique based on the difference between the first of the measurements and each other of the measurements.

Another illustrative embodiment is a method of context aware movement recognition. The method comprises receiving a plurality of measurements of a first unit of inertia from a sensor or plurality of sensors placed on various body segments that include a 3D accelerometer and a 3D gyroscope. Each of the measurements is taken at different times. The method also comprises determining a difference between a first of the measurements and each other of the measurements. The method also comprises classifying a movement of an object attached to the sensor irrespective of an orientation of the sensor on the object utilizing a signal recognition technique based on the difference between the first of the measurements and each other of the measurements.

Yet another illustrative embodiment is a non-transitory computer-readable medium. The non-transitory computer-readable medium stores instructions that when executed on a computing system cause the computing system to receive a plurality of measurements of a first unit of inertia from a sensor or plurality of sensors placed on various body segments that include a 3D accelerometer and a 3D gyroscope, each of the measurements taken at different times, determine a difference between a first of the measurements and each other of the measurements, and classify a movement of an object attached to the sensor utilizing a signal recognition technique based on the difference between the first of the measurements and each other of the measurements.

BRIEF DESCRIPTION OF THE DRAWINGS

For a detailed description of various examples, reference will now be made to the accompanying drawings in which.

NOTATION AND NOMENCLATURE

Figure 1:
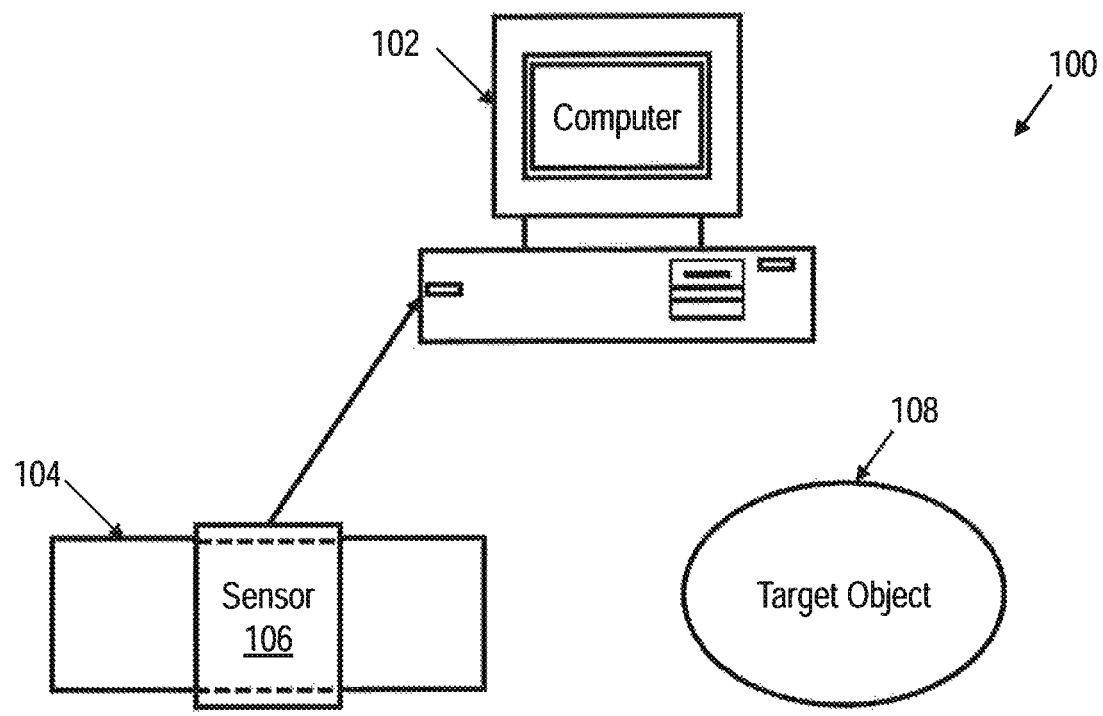
FIG. 1 shows an illustrative block diagram of a movement recognition system utilizing a sensor in accordance with various embodiments.

Certain terms are used throughout the following description and claims to refer to particular system components. As one skilled in the art will appreciate, entities and/or individuals may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As discussed above, the design of movement recognition algorithms in conventional systems typically requires information about the placement and orientation of inertial sensors on the body, and the signal processing is often designed to work with a known orientation and placement of the sensors. However, accidental displacement of the sensors may occur due to the user's movement. Also, various manufacturers may place sensors with various orientations. For example, inertial sensors may be incorporated into eyewear or glasses and may be placed on or embedded within on any part of the frame with an arbitrary orientation. Therefore, it would be desirable to design a system that includes an orientation independent movement recognition approach that functions irrespective of how a sensor, or plurality of sensors are placed on a user (i.e., irrespective of the orientation of the sensor).

In accordance with various examples, a movement recognition system is provided that includes an orientation independent movement recognition approach that functions irrespective of how a sensor, or plurality of sensors are placed on a user. Furthermore, the movement recognition system may have context awareness such that, by fusing information from the sensor and the environment in which the sensor is operating, the system is capable of determining the direction the user is pointing and location of the sensor when performing various movements. Thus, the system may utilize the recognized movement, the direction of the sensor (or the movement), and the location of the sensor, or any combination of these measurements, to control various target objects.

FIG. 1 shows an illustrative block diagram of a movement recognition system 100 utilizing a sensor 106 in accordance with various embodiments. The movement recognition system 100 may include computer system 102, sensor 106, and, in some embodiments, one or more target objects 108. Computer system 102 may include computer hardware that may execute instructions stored in computer system 102 or stored in another computer system and/or memory connected to computer system 102. While shown as a desktop computer, computer system 102 may be any electronic device having some amount of computing power. Among other things, servers, portable computers, personal digital assistants (PDAs), and mobile phones may be configured to carry out aspects of the disclosed embodiments. In some embodiments, the computer system 102 is physically coupled with the sensor to form a wearable device. In some embodiments, computing system 102 may include several computers and components that are interconnected via communication links, using one or more computer networks or direct connections.

Sensor 106 may be any type of inertial sensor that may measure information corresponding to an object's inertial movement, sometimes referred to as a unit of inertia (i.e., specific force, acceleration, angular rate, pitch, roll, yaw, and/or magnetic field). Thus, sensor 106 may be an accelerometer, a gyroscope, a magnetometer, or any combination thereof. For example, sensor 106 may include both an accelerometer and a gyroscope. In an alternative example, sensor 106 may include only an accelerometer. In some embodiments, sensor 106 is a micro-electro-mechanical system (MEMS). In an embodiment, the sensor 106 includes a 9-axis MEMS sensor which captures 3-axis (i.e., 3D) acceleration, 3-axis (i.e., 3D) angular velocity, and 3-axis (i.e., 3D) magnetic strength data.

Sensor 106 may be coupled to an object 104 to measure the object 104's inertial movement. For example, sensor 106 may be coupled to object 104 to measure object 104's acceleration, angular velocity, and/or the magnetic field surrounding the object 104. Object 104 may be any type of object including animate objects such as a human wrist or any other human body part. For example, sensor 106 may be coupled to the wrist of a human such that the sensor 106 measures inertial movement of the human's wrist. In an alternative example, sensor 106 may be incorporated into a mobile phone and held by a user. Thus, in this example, the object 104 may be the hand of the human, and the sensor 106 may measure the inertial movement of the human's hand. Additionally, in some embodiments, multiple sensors may make up the sensor 106. For example, one sensor may be coupled to a human wrist, a second sensor may be coupled to a human ankle, a third sensor may be coupled to a human shoulder, etc. In this example, one or more of the first, second, and third sensors is the sensor 106. Similarly, the object 104 may, in some embodiments, be made up of multiple objects. Thus, utilizing the previous example, the human wrist, the human ankle, and the human shoulder may comprise the object 104.

The sensor 106 may be wirelessly and/or wireline coupled to computer system 102. For example, sensor 106 may be configured to communicate data to computer system 102 through a network based on the IEEE 802.15.4e standard, a wireless local area network ("WLAN"), such as a network based on the IEEE 802.11 standard, a wireless personal area network ("WPAN") (e.g., a BLUETOOTH network), and/or a wired Inter-Integrated Circuit ($I^2C$) and/or Serial Peripheral Interface (SPI). Thus, sensor 106 may communicate a signal and/or signals to computer system 102 representative of the inertial measurements of object 104. For example, the sensor 106 may communicate acceleration data, angular velocity data, and/or magnetic data to the computer system 102 for further processing.

The target object 108 may be any object that a user may wish to control through the use of specific movements of object 104 and/or sensor 106. For example, the target object 108 may be a light and/or a television. The computer 102 may be configured to determine the movement of the object 104 and/or sensor 106 and control the target object 108 based on the detected movement.

Figure 2:
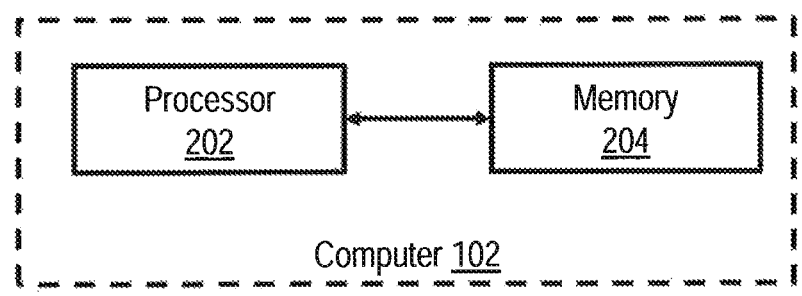
FIG. 2 shows an illustrative block diagram of a computer in a movement recognition system utilizing a sensor in accordance with various embodiments.

FIG. 2 shows an illustrative block diagram of computer system 102 of movement recognition system 100 in accordance with various embodiments. The computer system 102 includes one or more processors 202 that may be configured to receive the signals representative of the inertial measurements of object 104 from sensor 106. Thus, the processor 202 may receive multiple measurements of one or more units of inertia (e.g., may receive acceleration measurements, angular velocity measurements, and/or magnetic field measurements) each taken at different times. For example, the processor 202 may receive one acceleration measurement taken at time 0, a second acceleration measurement taken at time 5 ms, a third acceleration measurement taken at time 10 ms, etc. Processor 202 may be coupled to system memory 204 via an input/output interface. Processor 202 may include a central processing unit (CPU), a semiconductor-based microprocessor, a graphics processing unit (GPU), and/or other hardware devices suitable for retrieval and execution of instructions that may be stored in memory 204 or other memory.

Processor 202 may include a single processor, multiple processors, a single computer, a network of computers, or any other type of processing device. For example, processor 202 may include multiple cores on a chip, multiple cores across multiple chips, multiple cores across multiple devices, or combinations thereof. Processor 202 may include at least one integrated circuit (IC), other control logic, other electronic circuits, or combinations thereof that include a number of electronic components. Processor 202 may perform operations such as graphics, signal processing, encryption, input/output (I/O) interfacing with peripheral devices, floating point arithmetic, string processing, etc.

Memory 204 may be any electronic, magnetic, optical, or other physical storage device that contains or stores executable instructions. Thus, memory 204 may be, for example, Random Access Memory (RAM), Read Only Memory (ROM), an Electrically Erasable Programmable Read-Only Memory (EEPROM), a storage drive, a Compact Disc Read Only Memory (CD-ROM), and the like. The computer may also include a network interface coupled to the input/output interface.

Figure 3:
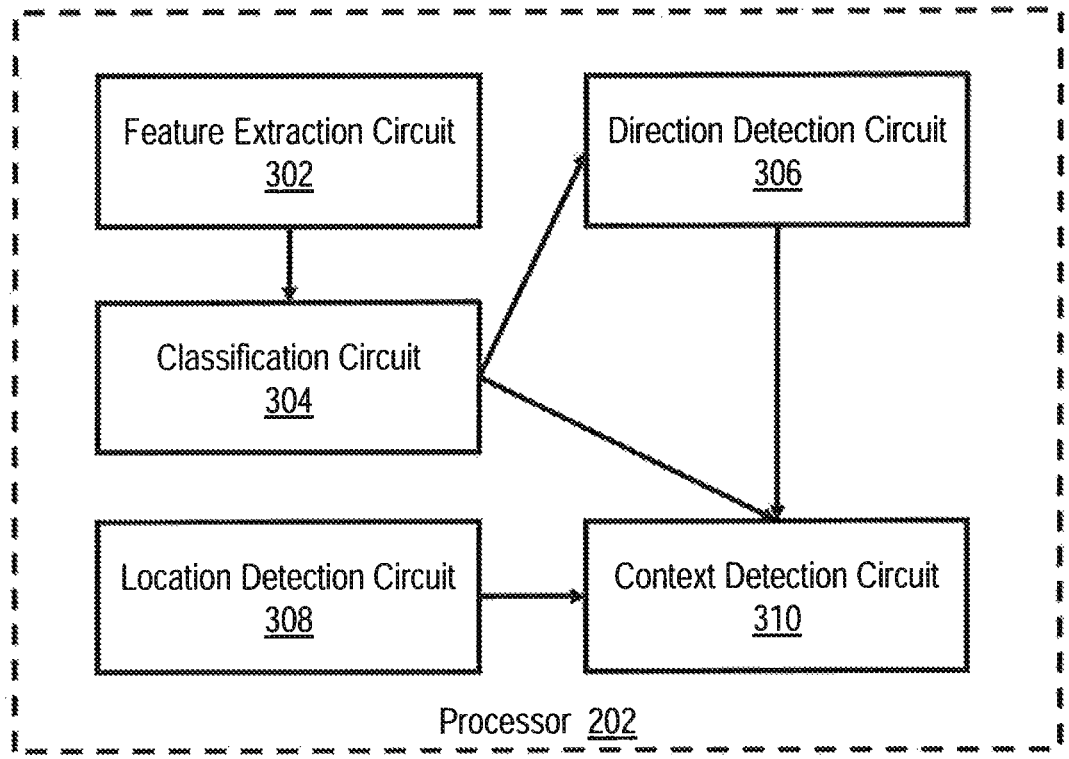
FIG. 3 shows an illustrative block diagram of a processor of a computer in a movement recognition system utilizing a sensor in accordance with various embodiments.

FIG. 3 shows an illustrative block diagram of processor 202 in accordance with various embodiments. Processor 202 may include feature extraction circuit 302, classification circuit 304, direction detection circuit 306, location detection circuit 308, and context detection circuit 310. In an embodiment, the feature extraction circuit 302 receives the measurements of the units of inertia that are representative of the inertial measurements of object 104 from the sensor 306. In some embodiments, the sensor 106 may have a sampling rate of 200 Hz, thus, the feature extraction circuit 302 may receive inertial measurements every 5 ms.

Because an objects movement, such as object 104, may change the orientation of the sensor 106, it may be desirable to generate a common feature set that is orientation independent and which considers classification techniques that are speed independent among various instances of the same movement. For example, the total angle change or acceleration observed by the sensor 106 during a movement may provide an orientation and speed independent common feature set. Thus, the feature extraction circuit 302 may be configured to determine a difference between a first of the inertial measurements received and each of the remaining, or a subset of the remaining, inertial measurements received from the sensor 106 for the movement. For example, the total angle change may be an integration of the total angular velocity over a short period of time (i.e., covering one movement).

Figure 4:
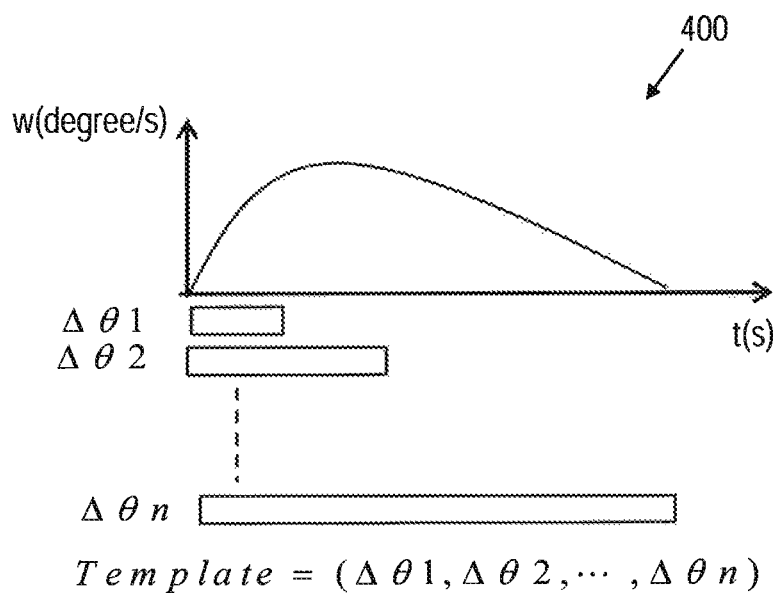
FIG. 4 shows an illustrative graph showing example sensor data for extracting features in accordance with various embodiments.

FIG. 4 shows an illustrative graph 400 showing example sensor data for extracting features in accordance with various embodiments. While the graph 400 and following example show feature extraction of a movement utilizing angular velocity measurements received from the sensor 106, the feature extraction circuit 302 may extract features of a movement utilizing other inertial measurements received from the sensor 106 (e.g., acceleration measurements) in a similar manner. In FIG. 4, the curve represents a time series of angular velocity readings from the sensor 106 with (n+1) samples. At is the time duration between two samples, which is the reciprocal of the sampling frequency. The X-axis is the time and the Y-axis represents the angular velocity. The measured movement may be divided into n segments of $\Delta\theta$'s. $w_{ix}$, $w_{iy}$ and $w_{iz}$ are the average angular velocities between $i^{th}$ and $(i+1)^{th}$ sample along the x-axis, the y-axis and the z-axis respectively. i refers to the $i^{th}$ segment of the measured movement.

In order to determine (e.g., calculate) the total angle change during $\Delta t$, the angle change along each axis is calculated and all these changes along each axis are summed. Then the 2-norm of the total angle change along each axis will be the total angle change during the movement as:

$$\Delta\theta_x = \Sigma_{i=1}^{n} w_{ix} * \Delta t \quad (1)$$

$$\Delta\theta_y = \Sigma_{i=1}^{n} w_{iy} * \Delta t \quad (2)$$

$$\Delta\theta_z = \Sigma_{i=1}^{n} w_{iz} * \Delta t \quad (3)$$

$$\Delta\theta = \sqrt[2]{\theta_x^2 + \theta_y^2 + \theta_z^2} \quad (4)$$

Because, in some embodiments, one feature value is not enough to capture the entire movement, a feature vector for a movement may be constructed. This feature vector is a time series of total angle change which captures changes over various time periods, as shown in FIG. 4.

As shown in FIG. 4, $\Delta\theta 1$ is the total angle change during the first $\Delta t$ seconds which may be determined from equations (1), (2), (3) and (4) above. $\Delta\theta 2$ is the total angle change during the first $2 \times \Delta t$ seconds and $\Delta\theta n$ represents the total angle change during the first $n \times \Delta t$ seconds. This movement classification template may capture all the rotation information during the movement. Every template is a representative time series or sequence of movements. In the template vector, all the n angle changes are orientation independent because they are determined based on the changes and not the absolute orientation of the one or more sensors that make up sensor 106. Therefore, because the angle change trend remains the same, the speed the user performs the movement and how the sensors are placed is inconsequential (i.e., the orientation of the sensor 106 on the object 104 is inconsequential), especially considering that the next level of classification determines the movement irrespective of speed variations. The only difference is the length of the classification template compared to a given movement which may be resolved by the classification circuit 304 to classify the movement.

Returning to FIG. 3, the classification circuit 304 may receive the extracted features, as determined by the feature classification circuit 302. The classification circuit 304 may be configured to classify the movement of the object 104 that is attached to sensor 106 utilizing a signal recognition technique based on the extracted features (i.e., based on the difference between the first of the inertial measurements received from the sensor 106 and each other of the measurements received from the sensor 106 during the movement) irrespective of the orientation of the sensor 106 on the body 104. For example, the classification circuit 304 may be configured to classify the movement by matching the extracted features to stored movement information (i.e., a classification template) for a particular movement (e.g., raising and lowering a user's hand). The classification circuit 304 may utilize any classification algorithm for classifying the movement, such as dynamic time warping (DTW), elastic matching (EM), hidden Markov model (HMM), etc.

The following example shows how, in an embodiment, the classification circuit 304 may classify the movement of the object 104 utilizing DTW, however, as discussed above, any classification algorithm may be used in other embodiments. Dynamic time warping is a template matching algorithm for measuring similarity between two time series which may vary with respect to speed. A user may perform the same activity at different speeds and the DTW can address the speed variation by finding correct alignments between the two time series. Meanwhile, by investigating the warping distance, the algorithm can perform segmentation automatically. Because of the speed variation in the movements, the length (in time) of the movement may vary. In some embodiments, a constant size windowing technique cannot be used to segment the received feature extraction data and perform the DTW. Therefore, the feature vector in a window may be preselected based on the time it takes to perform various movements. For example, the window may be set to 2.5 seconds if the longest movement duration for the stored classification template movements is 1.67 seconds (i.e. 1.5 times the longest movement duration). Thus, if the longest movement that may be classified is moving from a sitting position to a lying position, and that takes 1.67 seconds, then the window may be set to 2.5 seconds. However, if the longest movement that may be classified is drinking a cup of coffee and that takes 9.33 seconds, the window size may be set to 14 seconds. This enables the time series feature vector to cover all target movements even if they are performed at a slower speed than the corresponding stored classification template. From the cumulative distance table between the classification template and the incoming time series feature vector, by utilizing zero padding or star padding, essentially replacing the first and/or the last column of cumulative distance with zero, the matching part will be selected, also realizing segmentation automatically.

Figure 5:
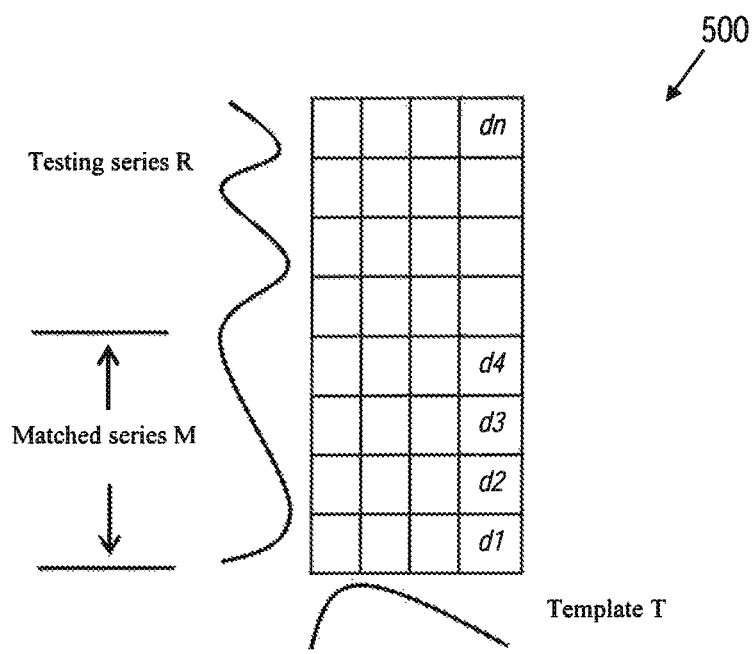
FIG. 5 shows an illustrative graph illustrating an auto-segmentation function in a classification circuit in accordance with various embodiments.

FIG. 5 shows an illustrative graph 500 illustrating an auto-segmentation function in a classification circuit in accordance with various embodiments. The classification template T may have m samples, and the testing feature series R may have n samples, where n>m. The classification template T is part of the testing series R. The graph 400, shown in FIG. 4 is the cumulative distance table of the two series. The minimum cumulative distance in the $m^{th}$ column in the distance table will be considered as the warping distance and the corresponding row index will be the ending sample of the matched series M in R. The warping distance and index are defined as:

$$[d_{warp}, \text{index}] = \min(d_i) \forall i \in [1, n] \quad (5)$$

where $d_i$ is the $i^{th}$ element in the $m^{th}$ column in the distance table. In the example in FIG. 4, d4 will be selected as the $d_{warp}$, which will be the warping distance between classification template T and series M.

Selecting multiple movement classification templates with larger variations will cover more cases and may provide a better accuracy for the DTW. However, that may increase computational complexity. To facilitate the operation of resource constrained computers, a single template or a smaller number of templates for each activity for each user may be chosen. The classification template may be chosen according to:

$$[d_{sum}, \text{index}] = \min(\Sigma_{j=1}^{n} d(t_i, t_j)), i \in [1, n] \quad (6)$$

where $d_{sum}$ is the minimum summation distance between the selected movement classification template and all the other instances of the movement, $d(t_i, t_j)$ is the time warping distance between template $t_i$ and template $t_j$, and n is the total number of classification templates. The selected movement classification template(s) is/are essentially closest to all the other instances of the movement and will serve as the best representative classification template(s).

To distinguish the target movements from the non-target movements, a threshold value may be chosen for the DTW distance. If the threshold value is too low, some target movements may not be detected resulting in a higher false negative rate. If the threshold is too high, non-target movements may be classified as target leading to a large false positive rate. Therefore, in some embodiments, a 5% maximum-margin hyperplane (MMH) may be chosen as the threshold value. The MMH is the best separation margin between two classes.

As discussed previously, the classification template for each movement may be generated by calculating the angle change (and/or, in some embodiments, the acceleration change) in the first n×Δt seconds. Here Δt is the reciprocal of the sampling frequency f of the sensor 106. If Δt is too large, not enough samples are included to represent the movement series. However, if Δt is too small, both the sampling rate and the number of samples will be too large leading to higher power consumption which may not be ideal for wearable or mobile computers that, in some cases, may be battery operated or otherwise power constrained. To determine the sampling frequency, in some embodiments, two factors may be considered. The first factor is the detection accuracy; it should not degrade the performance of the algorithm. The accuracy is defined as:

$$\text{accuracy} = \frac{TP + TN}{TP + TN + FN + FP} \quad (7)$$

where TP, TN, FP and FN are the true positive, true negative, false negative and false positive rates, respectively. The second factor is the consistency of DTW distance for various instances of the same movement. This is an indication of how well DTW can represent a specific movement for a specific sampling frequency. In alternative embodiments, the sampling frequency of the sensor 106 may be set to any frequency, and may be set to maximize the ability of the specific classification algorithm (e.g., DTW, EM, HMM) being utilized.

For some movements, a part of the movement may be inconsistent from movement to movement. Thus, if the movement is considered as a whole, the system 100 classification circuit 304 may have a difficult time classifying the movement. For example, the movement of drinking coffee may be broken into three sections (e.g., 1) picking up the cup; 2) arbitrary movements (e.g., shaking the cup, holding the cup, etc.); and 3) drinking the coffee). In other words, for certain movements, there may be certain parts of the movement that are inconsistent from movement to movement while other parts of the movement are consistent from movement to movement. In order to classify movements that have inconsistent parts, the classification circuit 304 may be configured to identify consistent aspects of stored movement information for the movement, identify inconsistent aspects of the stored movement information, and match the extracted features from the feature extraction circuit 302 to the consistent aspects of the stored classification template while ignoring the inconsistent aspects of the stored classification template. For example, the classification circuit 304 may only match the movements from sections 1 and 3 of the coffee movement while ignoring section 2 to classify the movement of drinking coffee. In some embodiments, the inconsistent parts of the movements may be removed from the template, and instead zero padding or star padding column may be added in the cumulative DTW table in lieu of the inconsistent part of the movement or template.

In some embodiments, it may be difficult to classify activities that have reversible instances (i.e., reversible movements). For example, it may be difficult to classify whether a person is moving from a sitting position to a standing position or from a standing position to a sitting position utilizing the measurements from the sensor 106. In order to distinguish between reversible movements, the classification circuit 304 may utilize a second unit of inertia (e.g., acceleration). For example, the amplitude of acceleration may be defined as:

$$\text{AcceAmp}(i) = \sqrt{a_x^2(i) + a_y^2(i) + a_z^2(i)} \tag{8}$$

where i is the $i^{th}$ sample of the acceleration and $a_x$, $a_y$, and $a_z$ represent the acceleration along x-axis, y-axis and z-axis, respectively.

Because, in some embodiments, acceleration data may be noisy, the data may be filtered (e.g., utilizing a low pass filter). For some movements, the peak maximum velocity and the low minimum velocity will be in a certain order based on the movement. For example, for the movement of a person moving from a sitting position to a standing position, the peak maximum velocity occurs after the low minimum velocity while for the movement of a person moving from a standing position to a sitting position, the peak maximum velocity occurs prior to the low minimum velocity. Thus, classification circuit 304 may be able to distinguish between certain movements by analyzing the order in which the peak maximum velocity occurs versus the low minimum velocity. Thus, the amplitude of the acceleration data and/or the rotational velocity may be utilized to classify a reversible movement. The use of the second unit of inertia by the classification circuit 304 to help classify a movement may be termed a second stage classifier.

The direction detection circuit 306 may be configured to determine a direction of the sensor 106 (or the movement) based on a direction template for the classified movement. For example, the direction detection circuit 306 may receive the temporal alignment information from the classification circuit 304 (e.g., DTW or warping path that is determined from acceleration or angular velocity readings) and magnetic field measurements surrounding the sensor 106 from the sensor 106. The magnetic field measured by sensor 106 may include a combination of both the earth's magnetic field and any magnetic field created by nearby objects. The earth's magnetic field may provide the information needed to determine the direction of the sensor 106 (or the movement) while the magnetic field generated by nearby objects may induce errors in the direction determination. There are two types of errors: hard-iron error and soft-iron error. The hard-iron error is caused by permanent magnetism and the soft-iron error is caused by induced magnetism. The hard-iron error can be considered a bias while soft-iron error is modelled as a 3*3 matrix. The following model may be utilized to calibrate the sensor 106 as a magnetometer:

$$\begin{bmatrix} m_x \\ m_y \\ m_z \end{bmatrix} = \begin{bmatrix} c_1 & c_2 & c_3 \\ c_4 & c_5 & c_6 \\ c_7 & c_8 & c_9 \end{bmatrix} \left( \begin{bmatrix} m_{nx} \\ m_{ny} \\ m_{nz} \end{bmatrix} - \begin{bmatrix} b_x \\ b_y \\ b_z \end{bmatrix} \right) \tag{9}$$

where $m_x$, $m_y$ and $m_z$ are calibrated magnetometer readings along the X-axis, the Y-axis, and the Z-axis respectively, $c_1$ to $c_9$ is the rotation matrix for modelling soft-iron error, $m_{nx}$, $m_{ny}$ and $m_{nz}$ are non-calibrated readings, and $b_x$, $b_y$ and $b_z$ are the bias. The sensor 106 may be rotated through many directions, and the sensor 106 magnetic data recorded. Since different locations have different magnetic distortions, the calibration may be completed for each location that the sensor 106 is sensing.

For object 104 movements, the headings of the sensor 106 may change as the object 104 moves. Thus, the magnetic data from the sensor 106 may not be converted into heading angles. Instead, the raw magnetic measurements by the sensor 106 may be used as a direction template for each movement. For example, for each movement, direction templates for all directions (e.g., four directions, six directions, eight directions, etc.) may be created. When a movement is classified by the classification circuit 304, in some embodiments, the DTW distance, while applying the DTW or warping path from acceleration or angular velocity readings, is calculated between the magnetometer data and all the generated direction templates. The direction may be determined by the direction detection circuit 306 as the direction of the direction template which gives the minimum distance.

In some embodiments, the direction detection circuit 306 may interpolate between two direction templates to determine the direction of the sensor 106 (or the movement). For example, if a minimum distance between the magnetometer data and any of the generated templates exceeds a threshold level, the direction detection circuit 306 may interpolate between the two direction templates with the minimum distances to determine the direction of the sensor 106 (or the movement). For example, if there are four templates for four directions (e.g., 0 degrees, 90 degrees, 180 degrees, and 270 degrees), and the direction of the sensor 106 (or the movement) is 45 degrees, the distance between the actual direction and the template direction may exceed a threshold value. The two template directions with the minimum distances are 0 degrees and 90 degrees. The direction detection circuit 306 may interpolate between the two template directions (0 degrees and 90 degrees) to determine the direction of sensor 106 (or the movement) as 45 degrees.

Since this approach is orientation independent and sensor 106 orientation may be different than a trained template, it may be necessary to transform the magnetometer orientation to the original orientation when the template is created. In many systems, the magnetometer of the sensor 106 has the same orientation as the accelerometer of the sensor 106. Therefore, if the transformation of the accelerometer is determined, the transformation of magnetometer may also be determined. If $t_i$ is the ith normalized acceleration sample from a template and $a_i$ is the matched normalized acceleration measurement from the recognized movement, they may both be 3 by 1 vectors, and the index matching may be achieved by a classification algorithm (e.g., DTW, EM, HMM). Given two sets of similar observations from two coordinate systems (two different sensor 106 orientations), in order to solve the transformation between these two sensor orientations, a rotation matrix between two coordinate systems from a set of (weighted) vector observations may be utilized. To solve this rotation matrix, the direction detection circuit 306 may minimize the least square error cost function as:

$$E(A) = \tfrac{1}{2} \sum_{i=1}^{n} w_i |t_i - A a_i|^2 \tag{10}$$

where n is the number of acceleration measurement samples of the accelerometer template and $w_i$ is non-negative observation weight. The cost function can be rewritten as:

$$E(A) = \sum_{i=1}^{n} w_i - \sum_{i=1}^{n} w_i t_i^T A a_i \tag{11}$$

$$E(A) = \lambda_0 - tr(AB^T) \tag{12}$$

where:

$$\lambda_0 = \Sigma_{i=1}^n w_i \quad (13)$$

and B is defined as:

$$B = \Sigma_{i=1}^n w_i k_i a_i^T \quad (14)$$

and tr is the trace of a matrix. Equation (12) can be rewritten with the quaternion representation as:

$$E(A(q)) = \lambda_0 - q^T K(B) q \quad (15)$$

where K(B) is the symmetric traceless 4 by 4 matrix as shown in equation (16) below and q is a 4-D quaternion which represents the rotation transformation instead of rotation matrix A.

$$K(B) = \begin{bmatrix} B + B^T - I_{3\times 3} tr(B) & \Sigma_i w_i k_i \times a_i \\ (\Sigma_i w_i k_i \times a_i)^T & tr(B) \end{bmatrix} \quad (16)$$

It follows that the optimal quaternion is the eigenvector of K(B) with the maximum eigenvalue:

$$K(B) q_{opt} = \lambda_{max} q_{opt} \quad (17)$$

where $q_{opt}$ is the optimal quaternion solution to equation (6) and $\lambda_{max}$ is the maximum eigenvalue of matrix K(B). $q_{opt}$ may then be used to transform the magnetometer data of the sensor 106 into the orientation at which the movement is trained in each direction and the direction can be determined as explained above. In alternative embodiments, the direction detection circuit 306 may utilize other classification methods to determine the direction of the sensor 106 (or the movement), or may use differential techniques determining changes over various time-scales as illustrated for the inertial sensors, as discussed above.

The location detection circuit 308 may be configured to determine a location of the sensor 106. For example, the location detection circuit 308 may determine where in a room the sensor 106 is located. Any localization method may be utilized by the location detection circuit 308 to determine the location of the sensor 106. For example, the location detection circuit 308 may use beacons, wireless, triangulation, acoustic based sensing, beam forming, GPS based sensing, and/or any other way of determining the location of the sensor 106. In some embodiments, the location of one or more target objects 108 may also be determined utilizing any localization method by the location detection circuit 308.

The context detection circuit 310 may determine which one of one or more target objects 108 the object 104 and/or sensor 106 is interacting with based on the location of the object 104 and/or sensor 106, the direction of the sensor 106 (or the movement), and/or the location of the target objects 108. Thus, the context detection circuit 310 may receive the direction information generated by the direction detection circuit 306 and the location information generated by the location detection circuit 308. Combining the location information and the direction information, the target object 108 at which the user is directed may be inferred with the knowledge of the location of the target objects 108 surrounding the user. In some embodiments, the context detection circuit 310 may also generate a control signal to the one target object 108 the sensor 106 is interacting with to control the one target object based on the classified movement. For example, the context detection circuit 310 may store instructions for each classified movement. Thus, for example, the movement of lifting a user's arm may indicate that the user wishes to turn a target object 108 off. Thus, once the context detection circuit 310 determines which of the target objects 108 the user is interacting with and receives from the classification circuit a classified movement (e.g., the user is lifting his/her arm), the context detection circuit 310 may generate a control signal that causes the target object 108 to turn off (i.e., alter state based on the stored classified movement).

Figure 6:
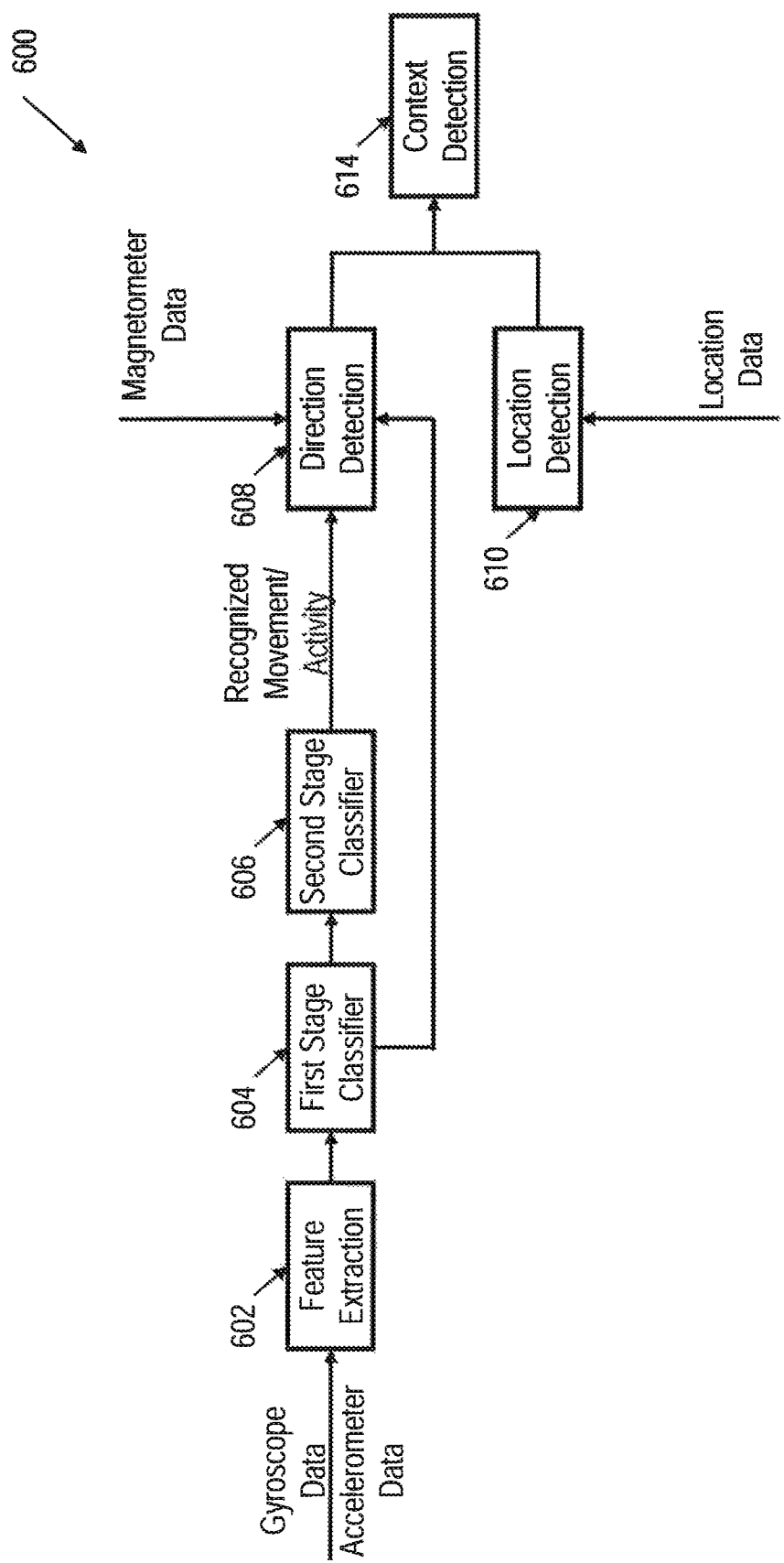
FIG. 6 shows an illustrative framework for recognizing movement based on the context in accordance with various embodiments.

FIG. 6 shows an illustrative framework 600 for recognizing movement based on context in accordance with various embodiments. The framework 600 begins in block 602 with feature extraction. For example, a feature extraction circuit 302 may be configured to extract features of the movement of one or more objects 104 utilizing data from one or more sensors (e.g., sensors located on different human appendages) included in sensor 106. In some embodiments, the feature extraction circuit 302 may receive gyroscope data (i.e., angular velocity data) and accelerometer data (i.e., acceleration data) from the sensor 106. In some embodiments, the features may be extracted by determining a difference between a first measurement (e.g., acceleration measurement and/or angular velocity measurement) received from the sensor 106 and each of a plurality of additional inertial measurements received from the sensor 106.

In block 604 the extracted features are received and the data is processed to classify the movement by a first stage classifier. For example, the classification circuit 304 may be configured to receive the extracted features and classify the movement of the sensor 106 and/or object 104 utilizing a classification algorithm (e.g., DTW, EM, HMM). Because in some embodiments, the movement may be a reversible movement that is difficult to classify, a second stage classifier, as shown in block 606, may be utilized to classify the movement. For example, the classification circuit 304 may utilize a second inertial measurement data (e.g., the amplitude of the acceleration data if the first stage classifier utilizes angular velocity data) to classify the movement. At this point, the type of movement of the object 104 and/or the sensor 106 may be classified (i.e., recognized) by the computer 102.

In block 608, direction detection may be utilized to determine the direction of the object 104 and/or sensor 106. For example, the direction detection circuit 306 may receive magnetometer data (i.e., magnetic field data) from the sensor 106 and the temporal alignment (e.g., DTW or warping path) from the classification circuit 304 (or first stage classifier 604). The direction detection circuit 306 may be configured to determine the direction of the sensor (or the movement) based on a direction template for the classified movement (e.g., match the detected magnetic field data to a stored direction template for a specific direction).

In block 610, location detection may be utilized to determine the location of the object 104 and/or sensor 106. For example, the location detection circuit 308 may be configured to determine the location of the object 104 and/or sensor 106 utilizing any location determination technique (e.g., beacons, wireless, triangulation, acoustic based, beam forming, GPS based, or any other way). Additionally, in some embodiments, the location detection circuit 308 may be utilized to determine the location of target objects 108 utilizing any location determination technique. In some embodiments, the location of the target objects 108 may be programmed into the location detection circuit 308.

In block 614, context detection may be utilized to determine which one of multiple target objects 108 the object 104 and/or sensor 106 is interacting with. For example, the context detection circuit 310 may be configured to determine which one of multiple target objects 108 the object 104 and/or sensor 106 is interacting based on the location of the object 104 and/or sensor 106 determined during location detection, the direction of the object 104 and/or sensor 106 (or movement) determined during the detection direction 608, and the location of the target object 108 determined during the location detection 610. The context detection circuit 310 may then generate a control signal to control the identified target object 108 based on the classified movement determined during the first 604 and/or second stage classifier 606 and stored instructions for a determined classified movement. The context detection circuit 310 may then transmit the control signal to the identified target object 108. The target object 108 may then alter its state (e.g., turn on/turn off, change volume, etc.) in response to receiving the control signal.

Figure 7:
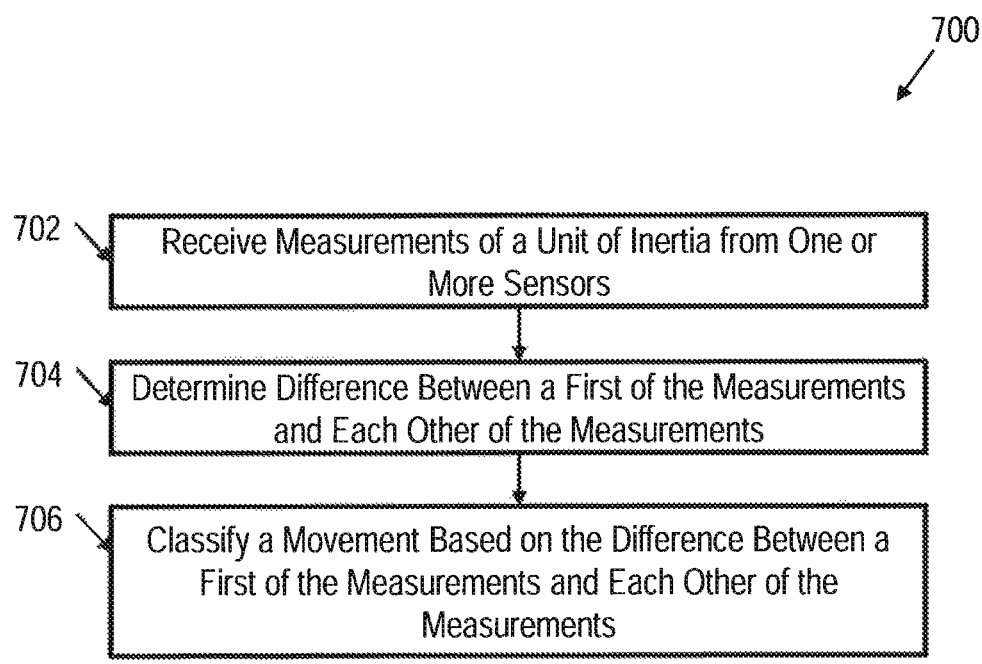
FIG. 7 shows an illustrative flow diagram of a method for classifying movement based on received sensor data in accordance with various embodiments.

FIG. 7 shows an illustrative flow diagram of a method 700 for classifying movement based on received sensor data in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, can be performed by the processor 202 (including the feature extraction circuit 302, the classification circuit 304, the direction detection circuit 306, the location detection circuit 308, and/or the context detection circuit 310) and implemented in logic and/or by a processor executing instructions stored in a non-transitory computer readable storage medium.

The method 700 begins in block 702 with receiving measurements of a unit of inertia from a sensor or multiple sensors placed on various objects (e.g., body segments of a human body). For example, a unit of inertia (acceleration data and/or angular velocity data) may be received from a sensor, such as sensor 106, by a feature extraction circuit, such as feature extraction circuit 302. In some embodiments, the feature extraction circuit may receive multiple measurements of the unit of inertia taken at different times.

In block 704, the method 700 continues with determining the difference between a first of the measurements and each other of the measurements. For example, the feature extraction circuit may be configured to extract features of a movement of the sensor by determining the difference between the first of the measurements and the other measurements taken during the movement during various changes in time.

The method 700 continues in block 706 with classifying a movement based on the difference between the first of the measurements and each other of the measurements. For example, a classification circuit, such as classification circuit 304, may receive the extracted features and classify the movement based on those extracted features. In some embodiments, the classification circuit may utilize a classification algorithm to match the received extracted features to a classification template of a movement stored in memory.

Figure 8:
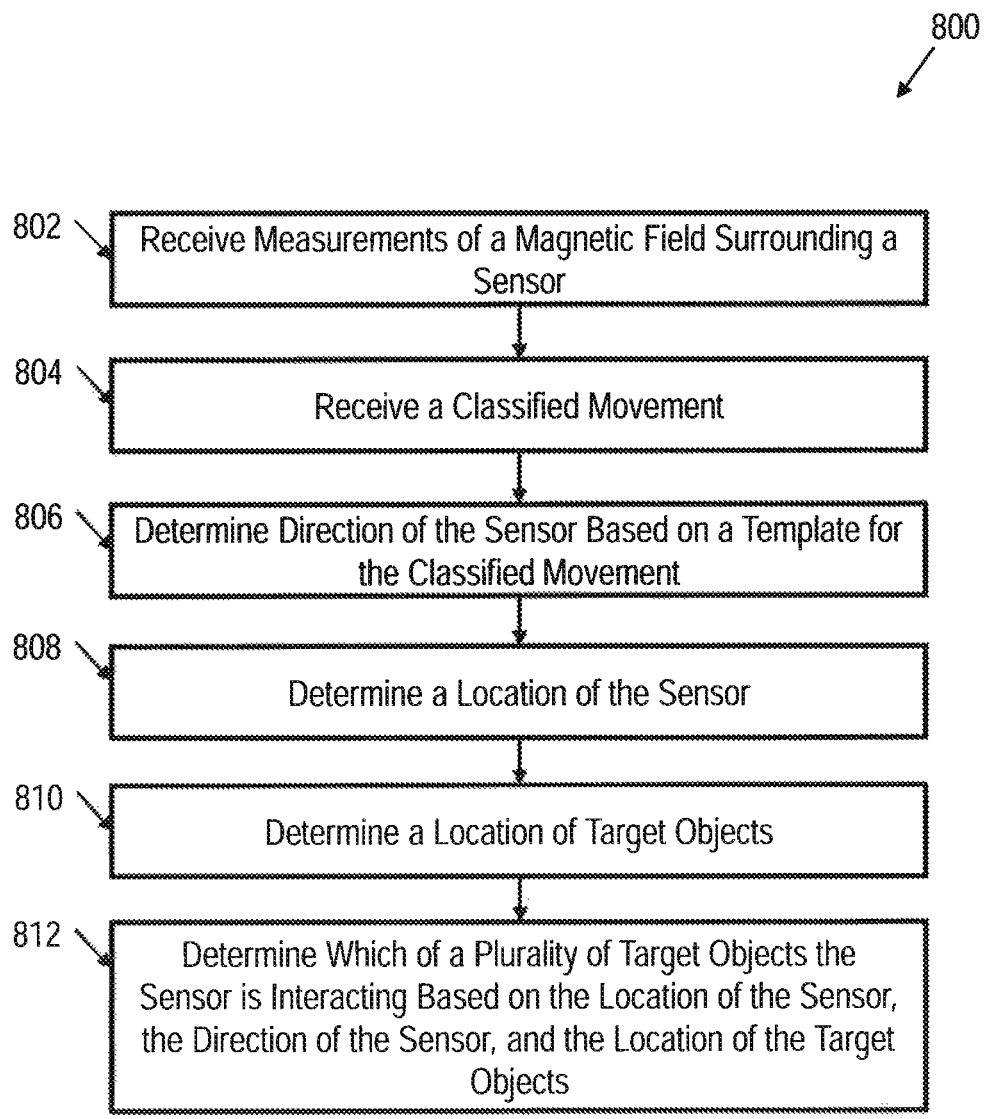
FIG. 8 shows an illustrative flow diagram of a method for detecting context in a movement based on received sensor data in accordance with various embodiments.

FIG. 8 shows an illustrative flow diagram of a method 800 for detecting context in a movement based on received sensor data in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 800, as well as other operations described herein, can be performed by the processor 202 (including the feature extraction circuit 302, the classification circuit 304, the direction detection circuit 306, the location detection circuit 308, and/or the context detection circuit 310) and implemented in logic and/or by a processor executing instructions stored in a non-transitory computer readable storage medium.

The method 800 begins in block 802 with receiving measurements of a magnetic field surrounding a sensor. For example, a direction detection circuit, such as direction detection circuit 306, may receive magnetic field data from a sensor, such as sensor 106. In block 804, the method 800 continues with receiving a classified movement (e.g., the temporal alignment, DTW or warping path determined leveraging accelerometer and/or gyroscope readings). For example, the direction detection circuit may receive from a classification circuit, such as classification circuit 304, the identity and/or type of movement and/or the temporal alignment of the movement of an object, such as object 104, to the template (e.g., DTW or warping path), and/or the sensor, such as sensor 106.

The method 800 continues in block 806 with determining the direction of the sensor (or the movement) based on a template for the classified movement while leveraging temporal alignment (e.g., DTW or warping path) form accelerometer or gyroscope classification. For example, the direction detection circuit may match the detected magnetic field data to a stored template for a specific direction of the sensor (or the movement). In block 808, the method 800 continues with determining the location of the sensor. For example, a location detection circuit, such as location detection circuit 308, may determine the location of the sensor utilizing any location determination technique. The method 800 continues in block 810 with determining the location of multiple target objects. For example, the location detection circuit may determine the location of one or more target objects, such as target objects 108, utilizing any location determination technique.

In block 812, the method 800 continues with determining which of the multiple target objects the sensor is interacting based on the location of the sensor, the direction of the sensor (or the movement), and the location of the target objects. For example, a context detection circuit, such as context detection circuit 310, may be configured to make the determination of which target object the sensor is interacting.

Figure 9:
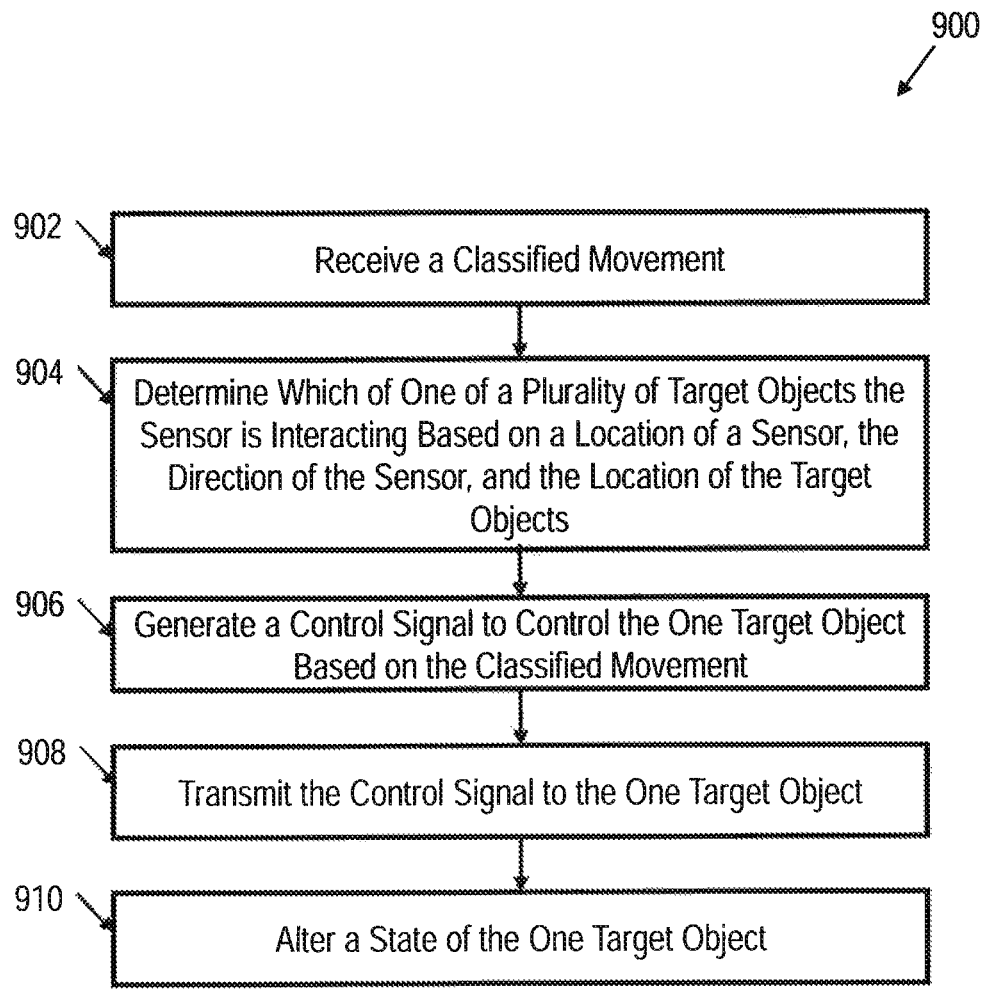
FIG. 9 shows an illustrative flow diagram of a method for controlling a target object based on sensor movement in accordance with various embodiments.

FIG. 9 shows an illustrative flow diagram of a method 900 for controlling a target object based on sensor movement in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 900, as well as other operations described herein, can be performed by the processor 202 (including the feature extraction circuit 302, the classification circuit 304, the direction detection circuit 306, the location detection circuit 308, and/or the context detection circuit 310) and implemented in logic and/or by a processor executing instructions stored in a non-transitory computer readable storage medium.

The method 900 begins in block 902 with receiving a classified movement (e.g., temporal alignment). For example, a direction detection circuit, such as direction detection circuit 306, may receive from a classification circuit, such as classification circuit 304, the identity and/or type of movement and/of temporal alignment of the movement of an object, such as object 104, to the template (e.g., DTW or warping path), and/or a sensor, such as sensor 106. In block 904, the method 900 continues with determining which one of a plurality of target objects the sensor is interacting based on a location of the sensor, the direction of the sensor (or the movement), and the location of the target objects. For example, a context detection circuit, such as context detection circuit 310, may be configured to receive location information for the sensor and multiple target objects from a location detection circuit, such as location detection circuit 308, and direction information for the sensor from a direction detection circuit, such as direction detection circuit 306 and make the determination of which target object the sensor is interacting.

The method 900 continues in block 906 with generating a control signal to control the one target object based on the classified movement. For example, the context detection circuit may be configured to generate a control signal to control the identified target object based on the classified movement determined by the classification circuit and stored instructions for a determined classified movement. In block 908, the method 900 continues with transmitting the control signal to the one target object. For example, the context detection circuit may transmit the control signal to the identified target object. The method 900 continues in block 910 with altering a state of the one target object. For example, the identified target object then may alter its state (e.g., turn on/turn off) in response to receiving the control signal.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A movement recognition system, comprising:
    a feature extraction circuit configured to:
        receive a plurality of inertial measurements from a sensor that includes a three dimensional (3D) gyroscope, each of the inertial measurements taken at different times; and
        generate a feature vector comprising a sequence of total angle changes over a plurality of time periods based on the inertial measurements and corresponding to a movement of an object coupled to the sensor, wherein the sequence of total angle changes comprises a first total angle change over a first time period and a second total angle change over a second time period, wherein the second time period begins before the first time period ends; and
    a classification circuit configured to classify the movement of the object attached to the sensor irrespective of an orientation of the sensor on the object utilizing a signal recognition technique based on the at least one feature vector.

2. The movement recognition system of claim 1, wherein the sensor additionally includes a 3D accelerometer, wherein the data is independent of a spatial orientation of the sensor, wherein the movement is a reversible movement and the classification circuit is further configured to classify the reversible movement based on an amplitude of acceleration or rotational velocity of the sensor.

3. The movement recognition system of claim 1, further comprising a direction detection circuit configured to receive a plurality of magnetic field measurements surrounding the sensor, receive temporal alignment information from the classification circuit, and determine a direction of the sensor or the movement based on templates for the classified movement.

4. The movement recognition system of claim 3, wherein the direction detection circuit is further configured to determine the direction of the sensor or the movement by interpolating between two direction templates for the classified movement.

5. The movement recognition system of claim 3, further comprising a location detection circuit configured to determine a location of the sensor.

6. The movement recognition system of claim 5, further comprising a context detection circuit configured to determine which one of a plurality of target objects the sensor is interacting based on the location of the sensor, the direction of the sensor or the movement, and a location of the target objects.

7. The movement recognition system of claim 6, wherein the context detection circuit is further configured to generate and transmit a control signal to the one target object the sensor is interacting to control the one target object based on the classified movement.

8. The movement recognition system of claim 1, wherein the classification circuit is further configured to determine consistent aspects of a stored classification template and inconsistent aspects of the stored classification template and identify the consistent aspects of the stored classification template and inconsistent aspects of the stored classification template in the stored classification template.

9. The movement recognition system of claim 8, wherein:
    the classification circuit is configured to classify the movement by comparing a difference between a first of the inertial measurements and each other of the inertial measurements to the consistent aspects of the stored classification template while ignoring the inconsistent aspects of the stored classification template.

10. The movement recognition system of claim 1, wherein the feature extraction circuit is further configured to:
    calculate an angle change along a first spatial axis;
    calculate an angle change along a second spatial axis distinct from the first spatial axis; and
    calculate an angle change along a third spatial axis, distinct from the first spatial axis and distinct from the second spatial axis;
    wherein the total angle change comprises a two-norm of the angle change along the first spatial axis, the angle change along the second spatial axis, and the angle change along the third spatial axis.

11. The movement recognition system of claim 10, wherein the first spatial axis corresponds to an x-axis, wherein the second spatial axis corresponds to a y-axis, and wherein the third spatial axis corresponds to a z-axis.

12. The moment recognition system of claim 10, wherein the first spatial axis corresponds to a first angle, wherein the second spatial axis corresponds to a second angle distinct from the first angle, and wherein the third spatial axis corresponds to a radius in a polar coordinate system.

13. A non-transitory computer-readable medium storing instructions that when executed on a computing system cause the computing system to:
    receive a plurality of inertial measurements from a sensor that includes a three dimensional (3D) gyroscope, each of the inertial measurements taken at different times;
    generate a feature vector comprising a sequence of total angle changes over a plurality time periods based on the inertial measurements and corresponding to a movement of an object coupled to the sensor, wherein the sequence of total angle changes comprises a first total angle change over a first time period and a second total angle change over a second time period, wherein the second time period begins before the first time period ends; and classify the movement of the object attached to the sensor irrespective of an orientation of the sensor on the object utilizing a signal recognition technique based on the at least one feature vector.

14. The computer-readable medium of claim 13, wherein the sensor additionally includes a 3D accelerometer, wherein the data is independent of a spatial orientation of the sensor, wherein movement is a reversible movement and the instructions further cause the computing system to classify the reversible movement based on an amplitude of acceleration or rotational velocity of the sensor.

15. The computer-readable medium of claim 13, wherein the instructions further cause the computing system to:
receive a plurality of magnetic field measurements surrounding the sensor;
receive temporal alignment information; and
determine a direction of the sensor or the movement based on templates for the classified movement.

16. The computer-readable medium of claim 15, wherein the instructions further cause the computing system to:
determine a location of the sensor; and
determine which one of a plurality of target objects the sensor is interacting based on the location of the sensor, the direction of the sensor or the movement, and a location of the target objects.

17. The computer-readable medium of claim 16, wherein the instructions further cause the computing system to:
generate a control signal to control the one target object based on the classified movement; and
transmit the control signal to the one target object.

18. The computer-readable medium of claim 15, wherein the instructions cause the computing system to classify the movement by:
identifying consistent aspects of stored movement information for the movement;
identifying inconsistent aspects of the stored movement information; and
comparing a difference between a first of the inertial measurements and each other of the inertial measurements to the consistent aspects of the stored movement information while ignoring the inconsistent aspects of the stored movement information.

19. The non-transitory computer-readable medium of claim 13, wherein the instructions, when executed on the computing system, further cause the computing system to:
calculate an angle change along a first spatial axis;
calculate an angle change along a second spatial axis distinct from the first spatial axis; and
calculate an angle change along a third spatial axis, distinct from the first spatial axis and distinct from the second spatial axis;

wherein the total angle change comprises a two-norm of the angle change along the first spatial axis, the angle change along the second spatial axis, and the angle change along the third spatial axis.

20. A method for context aware movement recognition comprising:
receiving a plurality of inertial measurements from a sensor that includes a three dimensional (3D) gyroscope, each of the inertial measurements taken at different times;
generating a feature vector comprising a sequence of total angle changes over a plurality of time periods based on the inertial measurements and corresponding to a movement of an object coupled to the sensor, wherein the sequence of total angle changes comprises a first total angle change over a first time period and a second total angle change over a second time period, wherein the second time period begins before the first time period ends; and
classifying the movement of the object attached to the sensor irrespective of an orientation of the sensor on the object utilizing a signal recognition technique based on the at least one feature vector.

21. The method of claim 20, wherein the sensor additionally includes a 3D accelerometer, wherein the data is independent of a spatial orientation of the sensor, wherein the movement is a reversible movement and classifying the reversible movement of the object is based on an amplitude of acceleration or rotational velocity of the sensor.

22. The method of claim 20, further comprising:
receiving a plurality of magnetic field measurements surrounding the sensor;
receiving temporal alignment information; and
determining a direction of the sensor or the movement based on a template for the classified movement.

23. The method of claim 22, further comprising:
determining a location of the sensor; and
determining which one of a plurality of target objects the sensor is interacting based on the location of the sensor, the direction of the sensor or the movement, and a location of the target objects.

24. The method of claim 23, further comprising:
generating a control signal to control the one target object based on the classified movement;
transmitting the control signal to the one target object; and
in response to the one target object receiving the control signal, altering a state of the one target object.

25. The method of claim 20, further comprising:
calculating an angle change along a first spatial axis;
calculating an angle change along a second spatial axis distinct from the first spatial axis; and
calculating an angle change along a third spatial axis, distinct from the first spatial axis and distinct from the second spatial axis;
wherein the total angle change comprises a two-norm of the angle change along the first spatial axis, the angle change along the second spatial axis, and the angle change along the third spatial axis.

* * * * *